UNITED STATES PATENT OFFICE.

SADAKICHI SATOW, OF SENDAI, JAPAN.

PROCESS OF MANUFACTURING VEGETABLE PROTEID SUBSTANCES.

1,275,308.     Specification of Letters Patent.     Patented Aug. 13, 1918.

No Drawing.     Application filed November 25, 1916. Serial No. 133,308.

*To all whom it may concern:*

Be it known that I, SADAKICHI SATOW, a subject of the Emperor of Japan, residing at Sendai, Japan, have made a certain new and useful Invention in Process of Manufacturing Vegetable Proteid Substances, (Case D,) of which the following is a specification.

This invention relates to vegetable proteids and the process of manufacturing the same from vegetable substances, such as corn, cereals, leguminous products or other proteid containing material.

The object of the invention is to provide vegetable proteid substances of improved quality and a simple, efficient and economical process of manufacturing the same from vegetable substances, such as cereals, leguminous products or other material for food purposes or for use in the manufacture of celluloid-like substances, linoleum-like substances, lacquer, varnish, artificial rubber, artificial leather and the like.

Further objects of the invention will appear more fully hereinafter.

In accordance with my invention I take the soja bean or other proteid containing substance, and dry it in any desired way, for example by placing the material in a revolving cylinder. In a great many uses of the proteid of the vegetable material, where a light color is not desired in the product to be manufactured from the proteids, the skin or covering of the vegetable material employed may be retained, but where a light color of the manufactured product is desired, the outer skin of the material is first removed in any desired way. In accordance with my invention I next flatten out the material employed whether soja bean or other vegetable substance, for example, by passing the same through rollers. This flattens the material and breaks down the cellular structures thereof, but does not remove or crush out the oil contained therein. If the material selected contains a high percentage of oil, it is desirable and necessary to remove the oil from the mass, and therefore I next treat the mass in any desired manner to remove the oil. This may be done in many different ways. One efficient way is to remove the oil by treating the mass after being flattened, as above explained, with a suitable solvent for oil, such as benzin. By first flattening the mass and thereby crushing the cellular structure, the oil of the mass is more readily and completely removed by the action of the benzin. When the benzin has removed the oil, it is then necessary to remove the remaining benzin from the mass. Heretofore this has been done by subjecting the mass to direct steaming. I have found, however, that the stearing is undesirable in that, due to the presence of moisture and high temperatures, the proteids of the mass become injured, thus lowering greatly the quality and the yield of the proteids. I have found that it is essential for securing good quality and the best yield of the proteids to avoid the presence of moisture and high temperatures as much as possible. This can be done either by using dry air of moderate temperature or vacuum. In either case the temperature of the mass under treatment should preferably be kept under 40° C. When air is used it may or may not be heated and it is passed into the cylinders containing the benzin-treated-mass, and is then passed to a condenser to remove the benzin, and from there to a heater to be reheated if heated air is employed, and utilized over again. By thus circulating the air and at the same time agitating the mass, I not only effect a more complete removal of the benzin, but I also minimize the loss of the solvent, and also decrease the time and labor required in carrying out the process. The product of this last operation is called hereinafter by the term "meal." The meal obtained by this process is perfectly white or slightly yellow in color, while that obtained by the usual method of steaming is dark yellow or brownish. The superior quality of the proteid product, which is the object to which the present invention is directed, depends upon the superior quality of the meal. The meal procured as above described is of superior quality, and physically speaking, it possesses a pleasant odor; it possesses little or no tendency to mold, it has the appearance of being perfectly dry, and is white in color as above stated; while, chemically speaking, it retains the proteids more nearly in their natural state.

The meal thus obtained is treated with water which extracts saccharocolloids, fiber and the proteids in the form of colloids or suspensoids. The liquid is separated from the meal residue and subjected either to direct precipitation or to further purification. If purification is desired the liquid is made alkaline by adding caustic or carbonated alkali or ammonia which dissolves the suspensoids or proteids, and then the purification of the liquid is effectively carried out either by mechanical means, such as by filtration, centrifusing or the like, or by physico-chemical means such as fractional precipitation, fractional solution of precipitated impure proteids, or the like, or by chemical means by converting one or more components into chemical compounds with different properties which permit their separation. These means are numerous and diverse, but effective when used separately or in combination.

The liquid obtained by purification as just described, is transparent and water white or pale yellow in color. The precipitation of the liquid, whether purified or not, is carried out by means of a ferment, such as lactic or acetic ferment.

The precipitate obtained as above described is allowed to settle and the supernatant liquid is drawn off, and the settled precipitate is then pressed into cakes, and if desired the cakes may be dried and powdered. The product obtained is termed hereinafter "refined proteid" and is employed as food material either alone or as a component of food preparations, or in the manufacture of a great variety of articles such as non-inflammable celluloid-like substances, lacquer, varnish, artificial leather, artificial rubber, linoleum-like substances, and all uses where vegetable proteid may be employed.

It will be observed that in carrying out my invention I avoid the use of formalin, the use of which results in the production of an exceedingly inert condensation product of proteids with formalin, which neither dissolves in water, organic solvents or aqueous solution of alkalis, acids, or salts, nor is acted upon by the usual chemical or physical agents. It is obtained in a powder form and as it possesses neither plasticity nor flexibility nor adhesiveness, it therefore cannot be worked for manufacturing plastic and flexible celluloid-like substances or articles, and owing to its inability to be brought again into the form of a solution it cannot be worked for manufacturing various commercial products such as varnish, linoleum-like substances, lacquer, or artificial leather, artificial rubber, and the like, and it is essential for manufacturing such last named useful articles, that the proteids are, or can be changed into a form which is, soluble in organic or inorganic solvent, and easily acted upon by chemical or physical agents.

It will also be observed that I avoid the use of coagulants such as aluminum sulfate or like metal compounds for obtaining the proteid product according to my invention. When such a metal compound is used the proteids pass into a combination with metal and form an inert and insoluble compound, which is similar in its undesirable properties to the condensation products just described, and cannot therefore be employed in the manufacture of celluloid-like substances, varnish, linoleum, lacquer, and the like, nor artificial leather, rubber and the like.

The proteid product, obtained according to my invention, when in wet condition, is white in color, tasteless, odorless, plastic and sticky when kneaded, while, in dry condition, it is white or pale yellow in color, tasteless, odorless and plastic, but does not become sticky even when kneaded with water, except when an alkali, an acid or other proteid solvent is also added. Chemically, the proteid product obtained as above described, whether in wet or in dry condition, shows all characteristic reactions of vegetable proteids, is soluble in all proteid solvents, and when dissolved in alkalis and acids, respectively, it forms alkali salts and acid salts, respectively. It evolves ammonia gas when heated with hydroxid of alkali, or of alkaline earth metals, and changes into a yellow mass when treated with concentrated nitric acid. It is easily rendered transparent, is adhesive, and can be easily molded into permanent shape. When dissolved in suitable solvents it forms derivations of proteid which are flexible, elastic, adhesive, tough, and strong, and which do not crack while drying, thus producing products well suited for the manufacture of various useful commercial articles where flexibility, elasticity, adhesiveness, toughness and strength are desirable qualities.

Having now described in detail the process of obtaining vegetable proteid in accordance with my invention, what I claim as new and useful, and of my own invention is,—

1. In the production of vegetable proteids, the process which consists in first removing the oil content from vegetable proteid containing material, then extracting with water the proteids contained in such oil freed material, and finally precipitating with lactic ferment the proteids contained in the extract.

2. In the production of vegetable proteids, the process which consists in first removing the oil content from vegetable proteid containing material, then extracting with water the proteids contained in such oil freed material, then clarifying the extract into a clear transparent solution, and finally precipitating with lactic ferment the proteids contained in the clarified extract.

In testimony whereof I have hereunto set my hand on this 16th day of November, A. D. 1916.

SADAKICHI SATOW.